(12) United States Patent
Ball

(10) Patent No.: US 11,998,935 B2
(45) Date of Patent: *Jun. 4, 2024

(54) SHOWER SYSTEM

(71) Applicant: Kohler Co., Kohler, WI (US)

(72) Inventor: Matthew Joseph Ball, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 137 days.

This patent is subject to a terminal disclaimer.

(21) Appl. No.: 17/693,858

(22) Filed: Mar. 14, 2022

(65) Prior Publication Data

US 2022/0193701 A1 Jun. 23, 2022

Related U.S. Application Data

(63) Continuation of application No. 16/537,147, filed on Aug. 9, 2019, now Pat. No. 11,273,457.

(60) Provisional application No. 62/718,473, filed on Aug. 14, 2018.

(51) Int. Cl.
| | |
|---|---|
| *A47K 3/28* | (2006.01) |
| *B05B 1/30* | (2006.01) |
| *E03B 1/04* | (2006.01) |
| *E03C 1/04* | (2006.01) |
| *E03C 1/10* | (2006.01) |
| *F16K 11/07* | (2006.01) |

(52) U.S. Cl.
CPC .............. *B05B 1/3026* (2013.01); *A47K 3/28* (2013.01); *E03B 1/04* (2013.01); *E03C 1/0408* (2013.01); *E03C 1/106* (2013.01); *F16K 11/07* (2013.01)

(58) Field of Classification Search
CPC ........... B05B 1/2026; A47K 3/28; E03B 1/04; E03C 1/0408; E03C 1/106; F16K 11/07
USPC ............................................................. 4/602
See application file for complete search history.

(56) References Cited

U.S. PATENT DOCUMENTS

| | | | |
|---|---|---|---|
| 5,274,860 A | 1/1994 | Avila | |
| 8,876,012 B2 * | 11/2014 | McMurtry | .............. E03B 1/048 |
| | | | 236/12.13 |
| 10,704,237 B2 | 7/2020 | Wu et al. | |
| 11,273,457 B2 * | 3/2022 | Ball | ...................... B05B 1/3026 |
| 2003/0026712 A1 * | 2/2003 | Beckerman | ........... E03C 1/0408 |
| | | | 417/307 |
| 2008/0072971 A1 | 3/2008 | Honeychurch et al. | |

* cited by examiner

*Primary Examiner* — Huyen D Le
(74) *Attorney, Agent, or Firm* — FOLEY & LARDNER LLP

(57) ABSTRACT

A shower system includes a water supply conduit, a reservoir, and a valve actuator. The reservoir is fixedly coupled to the water supply conduit such that the reservoir and the water supply conduit are fluidly coupled. The valve actuator is configured for actuation between a first position in which water is supplied from the water supply conduit and a second position in which water is supplied from the reservoir. In some implementations, the shower system further includes a showerhead that is fluidly coupled to the water supply conduit and the reservoir such that water may be supplied from either the water supply conduit to the showerhead or from the reservoir to the showerhead.

20 Claims, 5 Drawing Sheets

US 11,998,935 B2

SHOWER SYSTEM

CROSS-REFERENCE TO RELATED PATENT APPLICATIONS

This application is a continuation of U.S. patent application Ser. No. 16/537,147, filed Aug. 9, 2019, which claims the benefit of and priority to U.S. Provisional Patent Application No. 62/718,473, filed Aug. 14, 2018, both of which are incorporated by reference herein in their entireties.

BACKGROUND

The present disclosure relates generally to shower systems. More specifically, the present disclosure relates to a shower system that allows for a user to selectively increase the inlet flow rate for a showerhead or other water delivery device above a maximum allowable inlet flow rate from a household water line.

SUMMARY

At least one exemplary embodiment of the present disclosure relates to a shower system. The shower system includes a water supply conduit, a reservoir, and a valve actuator. The reservoir is fixedly coupled to the water supply conduit such that the reservoir and the water supply conduit are fluidly coupled. The valve actuator is configured for actuation between a first position in which water is supplied from the water supply conduit and a second position in which water is supplied from the reservoir.

Another exemplary embodiment of the present disclosure relates to a shower system. The shower system includes a water supply conduit, a reservoir, a showerhead, and a valve actuator. The reservoir is fluidly coupled to the water supply conduit. The showerhead is fluidly coupled to the water supply conduit and the reservoir. The valve actuator is configured for actuation between an open position in which water is supplied from the water supply conduit to the showerhead and a closed position in which water is supplied from the reservoir to the showerhead.

Yet another exemplary embodiment of the present disclosure relates to a valve actuator. The valve actuator includes a valve body, a diverter, and a biasing member. The valve body defines a first inlet, a second inlet, a first outlet, and a second outlet. The first outlet is at least partially aligned with the first inlet and the second outlet is at least partially aligned with the second inlet. The valve body further includes a central longitudinal channel extending between the first inlet and the first outlet and also between the second inlet and the second outlet. The diverter is disposed in the central longitudinal channel. The diverter is configured to actuate the valve actuator between an open position in which the first inlet is fluidly coupled to the first outlet and a closed position in which the second inlet is fluidly coupled to the second outlet. The biasing member is disposed in the central longitudinal channel between the diverter and the valve body. The biasing member is configured as a mechanical switch that automatically biases the diverter toward the open position when a flow rate of water between the second inlet and the second outlet drops below a threshold value.

This summary is illustrative only and is not intended to be in any way limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
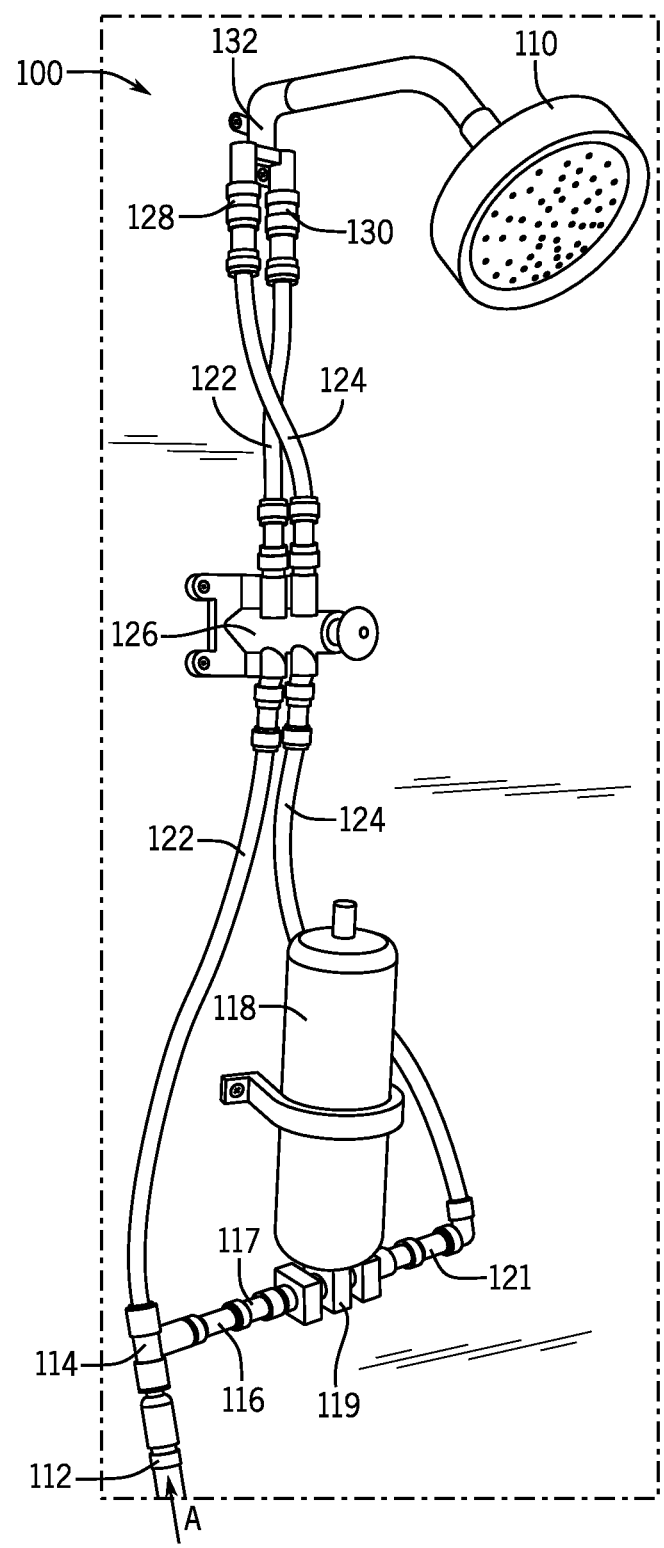
FIG. 1 is a perspective view of a shower system according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, the maximum allowable inlet flow rate to a showerhead from a household water line in the United States is limited to 2.5 gpm based on current legislation. Recently, California enacted legislation that will limit the maximum flow rate to 1.80 gpm. While these reduced inlet flow rates can help with water conservation, they may not be suitable for rinsing tasks or deluge functions in a shower environment (e.g., rinsing soap or shampoo, etc.). For these types of tasks, a higher flow rate is desirable.

Most conventional shower systems, however, have only one specific flow rate. Some systems can allow for an increase in flow rate by reusing or recirculating water that has been previously discharged by the shower system. The use of used/recycled water, however, may be undesirable to some users. Additionally, installation of these types of systems typically requires extensive modifications to the shower environment. Accordingly, a system that provides for an on-demand increase in inlet flow rate for a showerhead that is easy to install, does not reuse/recycle previously discharged water, and that complies with local regulations, would be desirable.

Referring generally to the figures, disclosed herein is a shower system that allows a user to selectively increase the inlet flow rate for a showerhead or other water delivery device above a maximum allowable inlet flow rate from a household water line, so as to provide for an improved user experience while still complying with local regulations and avoiding recirculation of used water. According to an exemplary embodiment, the disclosed shower system includes an unregulated showerhead (i.e., a showerhead without a flow regulator installed in it) that is fluidly coupled to a system including a plurality of flow regulating check valves, a pressurized reservoir, and a valve actuator. The disclosed system includes a first flow regulator that can limit the flow rate for the system to desired/legal limits, depending on geographic region (e.g., 2.5 gpm, 1.8 gpm, etc.). Downstream of the first flow regulator, a substantial amount of the flow (e.g., 75%, 85%, etc. depending on the rating of flow regulator) can pass through a normally open push-button valve actuator (although other types of valves/actuators may be used), then through a second flow regulator having a lower flow rating than the first flow regulator before entering the showerhead. Upstream of the second flow regulator, a portion of the flow is diverted into a reservoir such as a tank, which may be pressurized (e.g., an air bladder, etc.). The tank can be filled to hold a potential maximum volume of water, depending upon the differences in the flow regulators selected and the size of the tank. When a user desires (e.g., when the tank is full, etc.), the user may actuate the push-button valve actuator, so as to supply water from the tank in addition to the incoming regulated water via a separate flow path at a flow rate that is higher than the system's inlet flow rate (e.g., than the flow rate provided by the first flow regulator, etc.). In this manner, the disclosed system allows a user to selectively increase the flow rate above the system's regulated input, while complying with local regulations, so as to provide a "boost" in water flow rate to, for example, provide an on-demand deluge function for a user.

According to another exemplary embodiment, the water stored in the reservoir may be directed to one or more different water delivery devices in response to actuation of the push-button valve actuator, such as a handheld sprayer and/or an overhead "rain" shower assembly.

Figure 2:
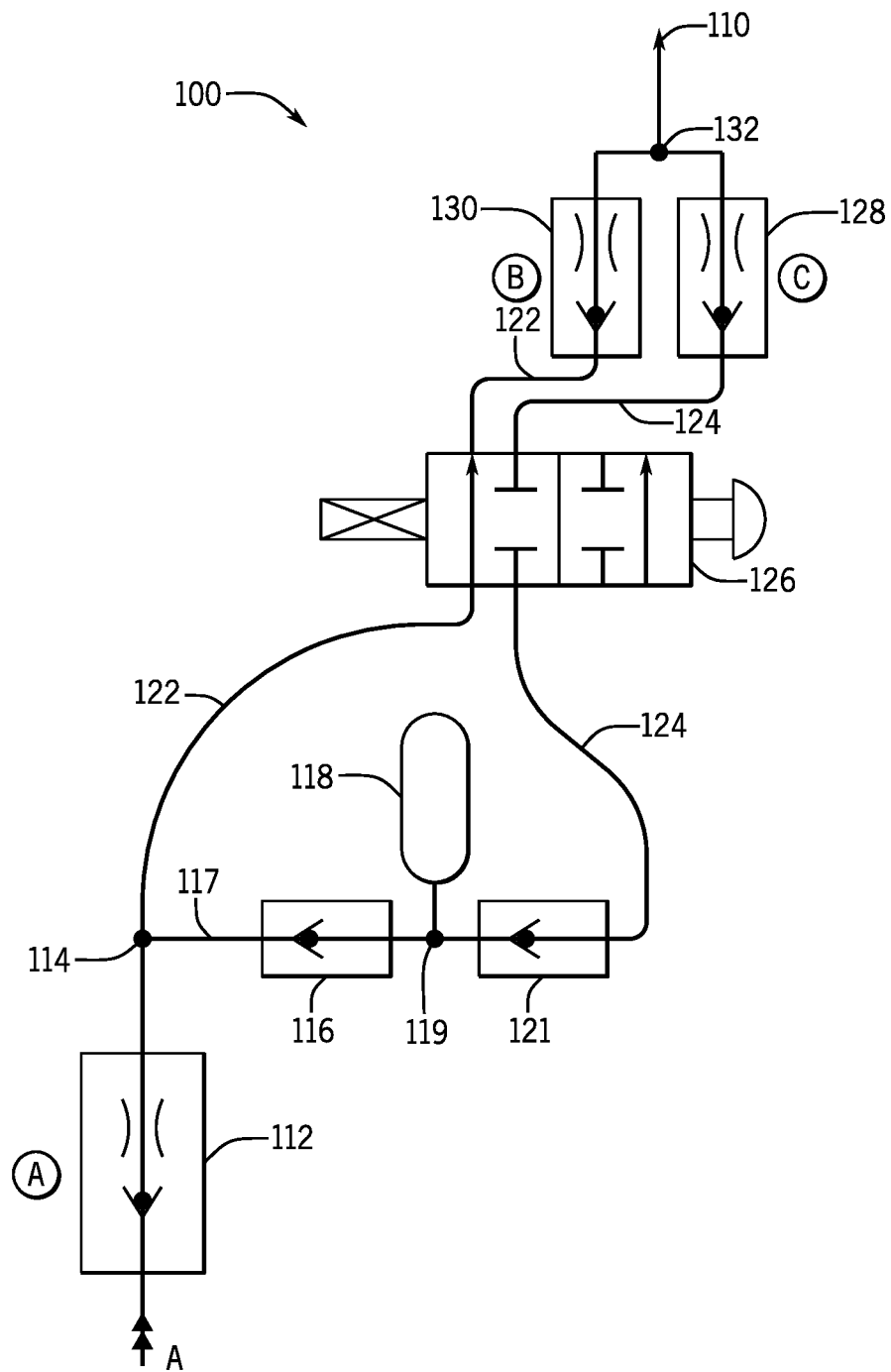
FIG. 2 is a schematic of the shower system of FIG. 1.

Referring to FIGS. 1-2, a shower system 100 is shown according to an exemplary embodiment. The shower system 100 includes a water delivery device shown as a showerhead 110, although the shower system 100 can include other types of water delivery devices, such as a handheld sprayer or an overhead "rain" shower assembly, according to other exemplary embodiments. The showerhead 110 does not have a flow regulator installed in it, and is referred to herein as an "unregulated" showerhead (e.g., unregulated water delivery device, etc.). The showerhead 110 is fluidly coupled to a water source "A", such as a normal household water supply line via a water supply conduit (e.g., a conduit, line, tube, etc.). A flow regulating check valve 112 is disposed downstream of the water supply source A and is configured to restrict or limit the inlet flow rate from water source A to a value dictated by local regulations for showerhead flow rates, depending on geographic region (e.g., 1.80 gpm, 2.5 gpm, etc.). In other exemplary embodiments, the flow regulating check valve 112 and/or other flow regulating check valves in the shower system 100 may be replaced/substituted with the combination of a check valve and a flow regulator.

Downstream of the check valve 112 is a connector 114 (e.g., a T-connector, etc.) for splitting/diverting a flow of water from the water source A between a primary conduit 122 (e.g., primary flow path, first flow path, etc.) and a secondary conduit 117 (e.g., secondary flow path, second flow path, etc.). A check valve 116 is disposed along the secondary conduit 117 for maintaining a desired pressure along the secondary conduit 117. According to an exemplary embodiment, the system 100 is configured such that a substantial amount of the flow from the water source A is directed through the primary conduit 122 (e.g., at least 75%, 85%, etc.). The portion of the flow that is directed through the secondary conduit 117 is further directed to a reservoir 118 (e.g., tank, etc.) via a connector 119 (e.g., a T-connector, etc.) to be pressurized, stored, and used on-demand in the future. The reservoir 118 is fixedly coupled to the water supply conduit such that the reservoir 118 and the water supply conduit are fluidly coupled (e.g., the reservoir 118 and the water supply conduit are coupled to one another without intervening valves that would prevent water from flowing into the reservoir 118 from the water supply conduit). In other words, the reservoir 118 is coupled to the water supply conduit such that the reservoir 118 may receive water continuously from the water supply conduit.

According to an exemplary embodiment, the reservoir 118 is a pressurized tank, such as an air bladder tank, although other types of pressurized reservoirs may be used.

The reservoir 118 is configured to store and selectively pressurize water that has been diverted to the secondary conduit 117 for future on-demand use by the showerhead 110 (or other water delivery devices, the details of which are described in the paragraphs that follow. According to an exemplary embodiment, the water pressure within the reservoir 118 can be selectively adjusted to provide a particular user experience. According to an exemplary embodiment, the reservoir 118 is insulated to help maintain a particular water temperature within reservoir 118. According to other exemplary embodiments, the reservoir 118 includes a heating system for heating the water and/or maintaining a particular temperature of the water stored in the reservoir. Downstream of the reservoir 118 is a check valve 121 disposed along a supplemental conduit 124 (e.g., high flow rate path, deluge flow path, etc.). The check valve 121 can, advantageously, help to maintain water pressure through the supplemental conduit 124 when pressurized water stored in the reservoir 118 is selectively released.

Still referring to FIGS. 1-2, a valve actuator 126, shown as a push-button actuator according to the exemplary embodiment of FIGS. 1-2, is fluidly coupled to both the primary conduit 122 and the supplemental conduit 124. According to other exemplary embodiments, the valve actuator 126 is another type of valve/actuator suitable for the particular application in a shower environment. The valve actuator 126 is configured for actuation between an open position in which water is supplied from the water supply conduit (e.g., directly from water supply A) and a closed position in which water is supplied from the reservoir 118. In other words, the valve actuator 126 is configured to be actuated by a user to selectively permit water flow from either the primary conduit 122 or the supplemental conduit 124 to the showerhead 110. Downstream of the valve actuator 126 is a flow regulating check valve 130 disposed along the primary conduit 122 that has a first flow rating, and a flow regulating check valve 128 disposed along the supplemental conduit 124 that has a second flow rating that is greater than the first flow rating. According to an exemplary embodiment, the flow regulating check valve 130 is configured to permit a flow rate of up to about 1.5 gpm, and the flow regulating check valve 128 is configured to permit a flow rate of up to about 2.5 gpm. It should be appreciated, however, that the particular rating of the flow regulating check valves 128, 130 can be selected based on a particular application, such as a particular geographic region that has a different flow rate requirement for showers. Downstream of the flow regulating check valves 128, 130 is a connector 132 (e.g., a Tee-connector, etc.) for fluidly coupling the primary conduit 122 and the supplemental conduit 124 to the showerhead 110.

The operation of the shower system 100 will now be described with reference to FIGS. 1-2. When a user turns on a flow of water for the showerhead 110 (e.g., by turning a handle or other type of actuator in the shower environment), the flow of water is directed from water source A through the flow regulating check valve 112 at a regulated flow rate that complies with local regulations, depending on geographic region. A substantial amount of the flow passes through the connector 114 and the primary conduit 122. The remainder of the flow is directed through the flow regulating check valve 116 and the secondary conduit 117 toward the connector 119. The portion of the flow that is directed through the connector 119 is permitted to pass into the reservoir 118, where the water is pressurized to a user selected pressure level. In a first state of operation of the valve actuator 126 shown schematically in FIG. 2, the flow passing along the primary conduit 122 is directed along a flow path "A-B" through the valve actuator 126 and the flow regulating check valve 130 to the showerhead 110 at a first flow rate (e.g., about 1.5 gpm, etc.).

Figure 4:
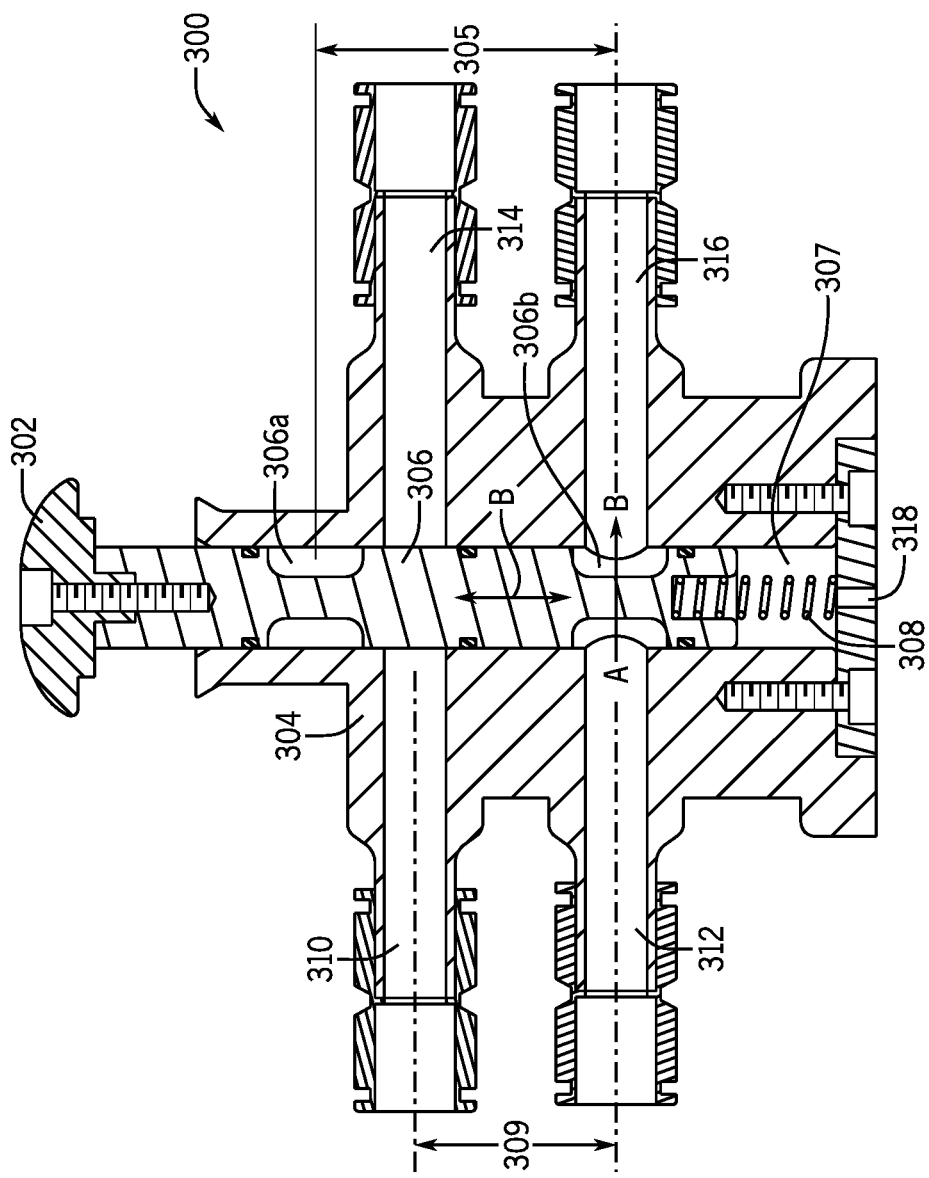
FIG. 4 is a cross-sectional view of a valve actuator for a shower system shown in a first state of operation according to an exemplary embodiment.
Figure 5:
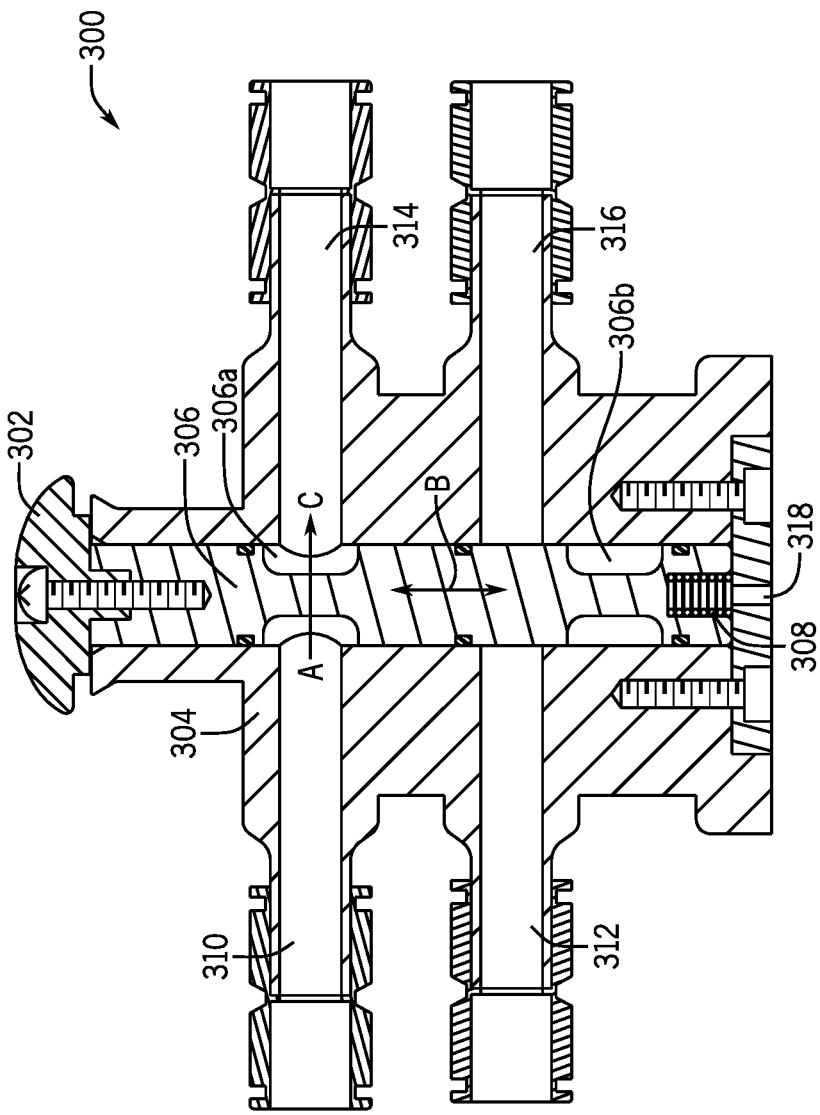
FIG. 5 is a cross-sectional view of the valve actuator of FIG. 4 shown in a second state of operation.

When a user desires a higher flow rate of water during a shower, such as to perform a rinsing task, the user can selectively actuate the valve actuator 126 to switch to a second state of operation (e.g., by pressing a button 302 shown in FIGS. 4-5, etc.). When the valve actuator 126 is actuated, the flow path "A-B" between the primary conduit 122 and the showerhead 110 is disconnected, and a flow path "A-C" between the supplemental conduit 124 and the showerhead 110 is created, such that the accumulated water in the reservoir 118 along with the regulated input flow from water source A is directed along the supplemental conduit 124 through the flow regulating check valve 128 to the showerhead 110 at a second flow rate that is greater than the first flow rate (e.g., about 2.5 gpm, etc.). In this manner, the shower system 100 can allow a user to selectively increase the water flow rate above the system's regulated input, while complying with local regulations.

Figure 3:
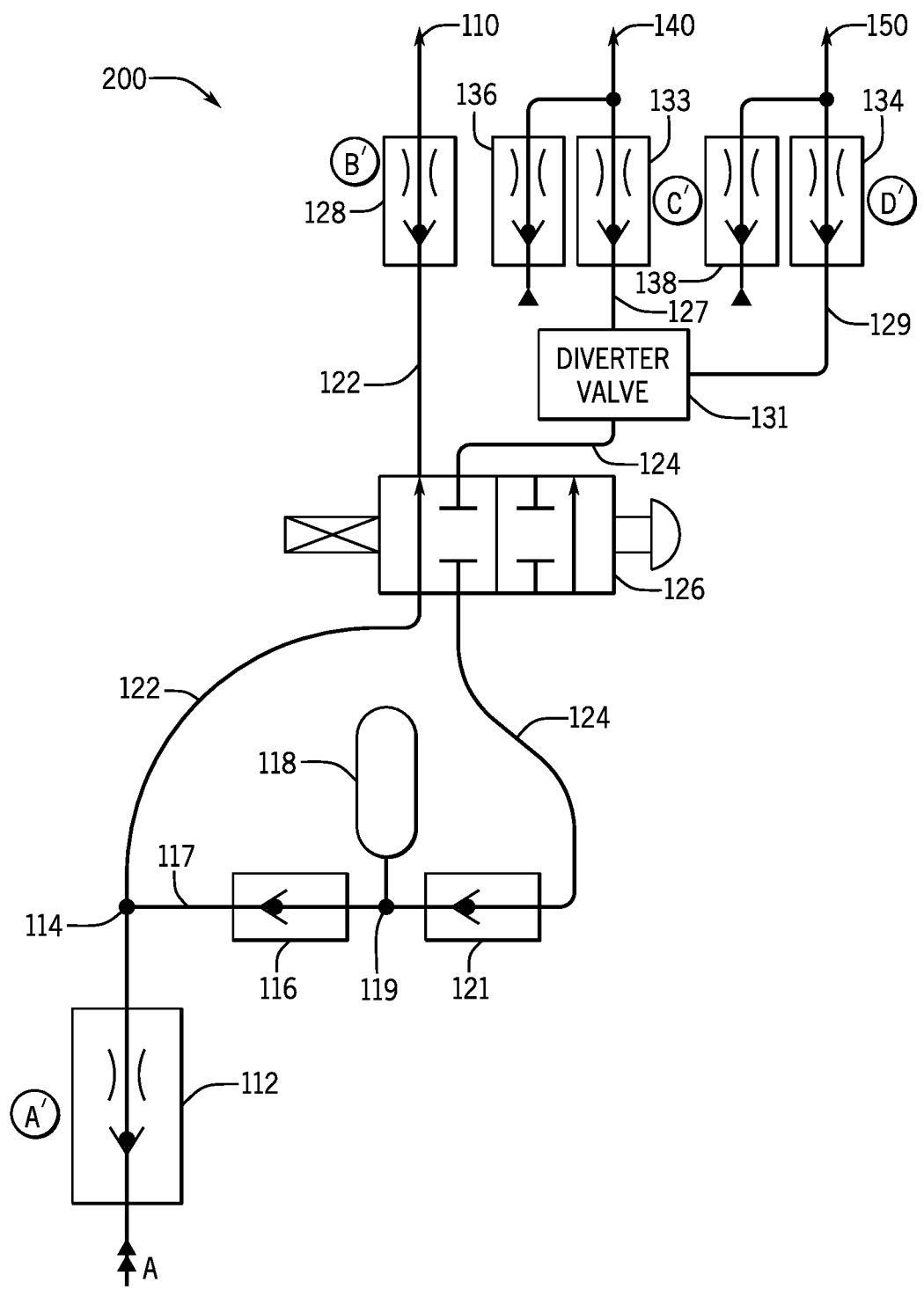
FIG. 3 is a schematic of a shower system according to another exemplary embodiment.

Referring to FIG. 3, a shower system 200 is shown according to another exemplary embodiment. For convenience, similar numbering has been used in FIGS. 2-3 to identify similar components. The system 200 is identical to the system 100 discussed above except for the addition of a diverter valve 131 and first and second water delivery devices 140, 150 (e.g., a handheld sprayer, an overhead "rain" showerhead, etc.) disposed along the supplemental conduit 124. The diverter valve 131 is configured to actuate between a first position in which water is supplied from the reservoir 118 to the first water delivery device 140 (e.g., independently from the second water delivery device 150), and a second position in which water is supplied from the reservoir 118 to the second water delivery device 150 (e.g., independently from the first water delivery device 140). For example, the system 200 is configured such that a user can actuate the valve actuator 126 to selectively direct a higher flow rate of water flowing along the supplemental conduit 124 from the reservoir 118 to a water delivery device other than the showerhead 110 (i.e., not along flow path A'-B'), such as a handheld sprayer, an overhead "rain" showerhead, or other water delivery devices/outlets designated generally at reference numerals 140 (i.e., flow path "A'-C'") and 150 (i.e., flow path "A'-D'").

As shown in FIG. 3, instead of having the supplemental conduit 124 fluidly couple to the showerhead 110 upstream of the valve actuator 126, the supplemental conduit 124 is fluidly coupled to a diverter valve 131 that is separate from the showerhead 110. The diverter valve 131 is fluidly coupled to a flow regulating check valve 133 via a first conduit 127 and to a first water delivery device 140. The diverter valve 131 is also fluidly coupled to a flow regulating check valve 134 via a second conduit 129 and to a second water delivery device 150. Additional flow regulating check valves 136 and 138 are disposed along separate flow paths/fluid conduits that run parallel with the first conduit 127 and the second conduit 129, respectively, so as to direct water from additional water sources to the first and second water delivery devices 140, 150, respectively. In this way, the shower system 200 can allow for scaling of different water flow rates along multiple flow paths to provide for numerous configurations with different water flow rate "boosts".

Referring to FIGS. 4-5, a valve actuator shown as a push-button valve actuator 300 is shown according to an exemplary embodiment. FIG. 4 illustrates the push-button valve actuator 300 in the first state of operation (e.g., using flow path A-B of FIGS. 1-2, etc.) and FIG. 5 illustrates the push-button valve actuator 300 in the second state of operation (e.g., using flow path A-C of FIGS. 1-2, etc.). The push-button valve actuator 300 can be used as the valve actuator 126 in any of the exemplary embodiments of FIGS. 1-3.

As shown in FIG. 4, the valve actuator 300 includes a valve body 304 that defines a first inlet 310, a second inlet 312, a first outlet 314, and a second outlet 316. The first outlet 314 corresponds to, and is aligned with, the first inlet 310, and the second outlet 316 corresponds to, and is aligned with, the second inlet 312. The valve body 304 further includes a central longitudinal channel 307 extending between the inlets 310, 312 and the outlets 314, 316. The inlets 310, 312 and the outlets 314, 316 are oriented laterally (e.g., in substantially perpendicular orientation) relative to the central longitudinal channel 307. A diverter 306 is slidably coupled to, and disposed in, the central longitudinal channel 307 between the inlets 310, 312 and the outlets 314, 316. A button 302 is disposed on an end portion of the diverter 306, and is configured to be accessible for a user to actuate in a shower environment (e.g., on a shower wall, etc.).

As shown in FIGS. 4-5, the diverter 306 is an elongated member that includes a first passageway 306a and a second passageway 306b each extending in a transverse direction through the diverter 306. The first passageway 306a is spaced apart from the second passageway 306b a distance 305 that is different than the spacing 309 between the first inlet 310 and the second inlet 312 on the valve body 304, such that when the first passageway 306a of the diverter 306 is aligned with the first inlet 310 of the valve body 304, as shown in FIG. 5, the second passageway 306b is not aligned with (i.e., is offset from) the second inlet 312. Likewise, when the second passageway 306b is aligned with the second inlet 312, as shown in FIG. 4, the first passageway 306a is not aligned with the first inlet 310. In this manner, when the diverter 306 is moved along a direction indicated generally by arrow "B" relative to the valve body 304 (e.g., when a user actuates button 302), the diverter 306 can selectively block or allow fluid to flow between the first inlet 310 and the first outlet 314, and between the second inlet 312 and the second outlet 316.

Still referring to FIG. 4, the push-button valve actuator 300 further includes a biasing member 308 (e.g., a spring, etc.) disposed between the diverter 306 and a portion of the valve body 304. The biasing member 308 can, advantageously, function to bias the diverter 306 to a second position illustrated in FIG. 5 from a first position illustrated in FIG. 4. For example, as shown in FIG. 4, the diverter 306 is in a first, normally-open position (e.g., first state of operation, etc.) in which a flow of water is permitted to flow along flow path A-B through the second inlet 312 and the second outlet 316. A user can selectively actuate the button 302 to move the diverter 306 from the first position shown in FIG. 4 to the second position shown in FIG. 5, so as to block the flow path A-B between second inlet 312 and the second outlet 316, and to allow a flow between the first inlet 310 and the first outlet 314 along flow path A-C. The valve actuator 300 is configured as a mechanical switch such that when the flow along flow path A-C ceases or drops below a threshold value, the diverter 306 is automatically biased by the biasing member 308 toward the first, normally-open position illustrated in FIG. 4, in which a flow of water is permitted to flow along flow path A-B through second inlet 312 and the second outlet 316. According to the exemplary embodiment shown in FIGS. 4-5, the valve body 304 includes an opening 318 where the biasing member 308 and the diverter 306 are located to provide a pressure relief for the central longitudinal opening 307 when the diverter 306 is moved within the valve body 304. A metering valve may be installed into central longitudinal opening 307 to provide pneumatic assistance/dampening to further control the rate of change over when switching between flow paths A-B to A-C(e.g., a rate of movement of the diverter 306 when switching between flow paths A-B to A-C, etc.). Similarly, a separate hydraulic or electronic circuit can also be used to control the rate of change over when switching between flow paths A-B to A-C.

According to another exemplary embodiment, the valve actuator 126 is electronically controlled using a processing circuit including a processor and a memory. The processing circuit can receive a feedback signal from the reservoir 118 to indicate a level or pressure of water in the reservoir, so as to automatically control the valve actuator 126 to, for example, switch back to the first state of operation using flow path A-B (e.g., when the level/pressure reaches a threshold value, etc.). According to an exemplary embodiment, the processing circuit can include a timer that is user adjustable to allow a user to selectively determine the duration of the second state of operation using flow path A-C.

The disclosed shower system can, advantageously, allow for a user to selectively increase the inlet flow rate for a showerhead or other water delivery device above a maximum allowable inlet flow rate from a household water line, so as to provide for an improved user experience while still complying local regulations and avoiding recirculation of used water.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the system as shown in the various exemplary embodiments is illustrative only. Additionally, any element disclosed in one embodiment may be incorporated or utilized with any other embodiment disclosed herein. For example, the push-button valve actuator 300 of the exemplary embodiment of FIGS. 4-5 may be incorporated in the exemplary embodiment of FIGS. 1-3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A shower system, comprising:
   a first conduit;
   a second conduit fluidly coupled to the first conduit at a first end of the second conduit;
   a water delivery device;
   a valve actuator fluidly coupled to both the first conduit and the second conduit, the valve actuator configured to selectively fluidly couple one of the first conduit or the second conduit to the water delivery device; and
   a reservoir disposed along the second conduit between the first end of the second conduit and the valve actuator.

2. The shower system of claim 1, wherein the water delivery device comprises a showerhead, further comprising a flow regulator upstream from the first conduit and the second conduit, the flow regulator configured to limit a flow rate of water entering the first conduit and the second conduit.

3. The shower system of claim 1, further comprising:
   a first flow regulator configured to receive water from the first conduit; and
   a second flow regulator configured to receive water from the second conduit, and wherein the first flow regulator has a lower flow rating than the second flow regulator.

4. The shower system of claim 3, wherein each of the first flow regulator and the second flow regulator are flow regulating check valves.

5. The shower system of claim 1, further comprising:
   a first water delivery device configured to receive water from the first conduit; and a second water delivery device configured to receive water from the second conduit, wherein the valve actuator is configured to actuate between a first position in which water is supplied from the first conduit to the first water delivery device and a second position in which water is supplied from the to the second conduit to the second water delivery device.

6. The shower system of claim 5, further comprising a third water delivery device and a diverter valve, wherein both the second water delivery device and the third water delivery device are fluidly coupled to the second conduit by the diverter valve, and wherein the diverter valve is configured to actuate between a first diverter position in which water is supplied from the reservoir to the second water delivery device and a second diverter position in which water is supplied from the reservoir to the third water delivery device.

7. The shower system of claim 1, further comprising a first check valve upstream of the reservoir between the reservoir and the first conduit, and a second check valve downstream of the reservoir between the reservoir and the valve actuator.

8. The shower system of claim 1, wherein the valve actuator is configured as a mechanical switch such that when a supply of water through the second conduit drops below a threshold value, the valve actuator automatically switches to supply water from the first conduit independently from the second conduit.

9. The shower system of claim 1, wherein the reservoir is a pressurized water tank configured to hold a volume of water.

10. A shower system, comprising:
a water supply conduit;
a reservoir fluidly coupled to the water supply conduit;
a water delivery device fluidly coupled to the water supply conduit and the reservoir; and
a valve actuator configured to actuate between a first position in which water is supplied directly from the water supply conduit to the water delivery device and a second position in which water is supplied to the water delivery device from both the water supply conduit and the reservoir.

11. The shower system of claim 10, further comprising:
a first flow regulator between the valve actuator and the water delivery device and configured to receive water from the water supply conduit; and
a second flow regulator between the valve actuator and the water delivery device and configured to receive water from the both the reservoir and the water supply conduit, and wherein the first flow regulator has a lower flow rating than the second flow regulator.

12. The shower system of claim 11, wherein each of the first flow regulator and the second flow regulator are flow regulating check valves.

13. The shower system of claim 10, further comprising a first check valve upstream of the reservoir between the reservoir and the water supply conduit, and a second check valve downstream of the reservoir.

14. The shower system of claim 10, wherein the reservoir is fluidly coupled to the water supply conduit upstream of the valve actuator without any intervening flow valves that would prevent water from flowing into the reservoir from the water supply conduit.

15. The shower system of claim 10, wherein the valve actuator is configured as a mechanical switch such that when a supply of water from the reservoir drops below a threshold value, the valve actuator automatically switches to supply water to the water delivery device directly from the water supply conduit.

16. A valve actuator, comprising:
a valve body defining a first inlet, a second inlet, a first outlet, and a second outlet, the valve body further comprising a central channel extending between the first inlet and the first outlet and also between the second inlet and the second outlet;
a diverter disposed in the central channel, the diverter movable between an open position in which the first inlet is fluidly coupled to the first outlet and a closed position in which the second inlet is fluidly coupled to the second outlet; and
a biasing member disposed in the central channel between the diverter and the valve body, the biasing member configured to automatically bias the diverter toward the open position when a flow rate of water between the second inlet and the second outlet drops below a threshold value.

17. The valve actuator of claim 16, wherein the diverter further comprises a button disposed on an end of the diverter, and wherein the button is configured to be accessible for a user to actuate the diverter.

18. The valve actuator of claim 16, wherein the diverter comprises a first passageway and a second passageway that both extend in a transverse direction through the diverter, and wherein a distance between the first passageway and the second passageway is greater than a spacing between the first inlet and the second inlet.

19. The valve actuator of claim 16, wherein the biasing member is a spring, wherein a first end of the spring is engaged with the diverter, and a second end of the spring is engaged with the valve body.

20. The valve actuator of claim 16, further comprising an opening disposed in the valve body proximate to where the biasing member is located, wherein the opening fluidly couples the biasing member to an environment surrounding the valve body.

* * * * *